United States Patent [19]

Clemino

[11] Patent Number: 4,670,338
[45] Date of Patent: Jun. 2, 1987

[54] MIRROR FOAMED GLASS SUBSTRATE AND METHOD OF MANUFACTURE

[75] Inventor: Alain Clemino, Longvilliers, France

[73] Assignee: Centre National de La Recherche Scientifique (C.N.R.S.), Paris, France

[21] Appl. No.: 810,553

[22] Filed: Dec. 18, 1985

[30] Foreign Application Priority Data

Dec. 19, 1984 [FR] France .................. 84 19471

[51] Int. Cl.⁴ .............. B32B 3/26; B32B 17/06
[52] U.S. Cl. ................. 428/312.6; 156/297; 156/299; 156/300; 428/49; 428/54; 428/55; 428/314.8; 428/316.6; 428/317.1; 428/319.1
[58] Field of Search .......... 428/49, 54, 55, 312.6, 428/312.8, 316.6, 912.2; 156/297, 299, 300, 314.4, 314.8, 317.1, 317.7, 319.1

[56] References Cited

U.S. PATENT DOCUMENTS

| 1,748,587 | 2/1930 | Smedley | 428/319.1 |
| 3,184,371 | 5/1965 | Seidl | 428/312.6 |
| 3,912,380 | 10/1975 | Klein | 350/310 |
| 4,035,065 | 7/1977 | Fletcher et al. | 350/310 |
| 4,422,893 | 12/1983 | Duchateau et al. | 428/912.2 |

FOREIGN PATENT DOCUMENTS

| 2345736 | 1/1976 | France . |
| WO82/01421 | 4/1982 | PCT Int'l Appl. . |
| 309236 | 4/1929 | United Kingdom . |

Primary Examiner—William J. Van Balen
Attorney, Agent, or Firm—Weiser & Stapler

[57] ABSTRACT

A mirror substrate, in particular for use in astronomical optics, comprises two symmetrical preformed plates of glass (10, 12) glued by their respective inside faces (26, 28) on either side of an intermediate structure (14), the outside face (38) of one of the plates (10) being suitable for subsequently receiving a reflecting coating. The intermediate structure (14) is a composite structure made of glass foam which is substantially uniform in nature, and in the preferred embodiments it comprises a central core (16) of glass foam together with two sets (18 and 20) of blocks of glass foam.

17 Claims, 4 Drawing Figures

MIRROR FOAMED GLASS SUBSTRATE AND METHOD OF MANUFACTURE

The present invention relates to a mirror substrate for use, in particular, in precision optics, and also to a method of manufacturing such a substrate.

The invention relates more particularly to a substrate for a very high precision mirror suitable for use in an astronomical telescope or in a similar apparatus.

BACKGROUND OF THE INVENTION

Astronomical optics require very high precision mirrors, since the maximum surface defect which can be tolerated in a reflecting optical component for use with visible spectrum light is about 0.135 micrometers.

Such mirrors are conventionally obtained from an optical component which is accurately machined and which is referred to as a "substrate", which optical component is then subjected to a subsequent process including the application of a reflecting coating. Such a reflecting coating is obtained in a manner known per se by depositing aluminum in a vacuum.

Obtaining mirror substrates, and consequently mirrors, with a sufficient degree of accuracy is made all the more difficult in that the mirrors used in astronomical optics are circular mirrors having a diameter of one meter or more. The machining of large diameter mirrors is constrained by phenomena concerned with the mirror substrate bending under its own weight because of its large size.

Another difficulty encountered with large diameter mirrors or mirror substrates stems directly from the weight of such mirrors or substrates in that they require particularly strong mechanical means for manipulating them, and such means are consequently expensive.

Another problem encountered in the manufacture of optically precise mirrors or mirror substrates is that the optical qualities of the mirror can only be tested after manufacture has been completed.

The first large diameter precision mirrors were obtained by casting a disk of glass. In addition to the problems associated with making such a large casting, it should be emphasized that mirrors obtained in this way are very heavy because of the high density of glass, which density lies in the range 2 and 2.5 as a general rule.

Other proposals have since been made to remedy these drawbacks, and in particular to obtain lighter mirrors.

Thus, cellular mirrors have been proposed comprising two plates of metal which are interconnected by an intermediate metal structure which is welded to the respective inside faces of the two metal plates. The outside face of only one of the two metal plates is then treated in order to constitute a mirror, with the other metal plate serving solely as a support member. Mirrors made in this way are non-uniform in structure and have never given good images.

The same principle was then considered in an application where the metal structure was replaced by a glass structure which was glued to the respective inside faces of two plates of glass.

This proposition suffered from numerous problems concerned with the gluing, and failed to provide satisfactory images either.

Another solution which was proposed for manufacturing lightened mirrors for the Mount Palomar telescope consisted in directly casting a suitably shaped structure, however the difficulties encountered in practice were very large.

Finally, it must be emphasized that current metal mirrors cannot be used successfully in astronomical optics. As for cellular mirrors whose structure is machined from a block of glass, the manufacturing costs are very high because of the amount of machining required and the difficulty of the machining that is to be performed.

One of the aims of the present invention is to provide a mirror substrate which is as uniform as possible and which is capable of providing a very high degree of optical accuracy, e.g. suitable for astronomical optics.

Another aim of the invention is to provide such an optically accurate substrate for a mirror which may be very large in size.

Another aim of the invention is to provide such a substrate of sufficient mechanical and thermal uniformity in order to remain within the limits imposed by the maximum size of defect which is tolerable for astronomical reflecting optics, namely 0.135 micrometers.

Another aim of the invention is to provide such a mirror substrate which is particularly light in weight and cheap to manufacture.

SUMMARY OF THE INVENTION

The present invention provides a mirror substrate which is intended, in particular, for providing precision optics, said substrate being of the type comprising two preformed plates of glass which are glued to each other via their respective inside faces which are disposed on either side of an intermediate structure. In a substrate of this type, the outside face of one of the two plates is suitable for being treated to obtain the required optical qualities, and then for being covered with a reflecting coating in such a manner as to form a mirror on said outside face.

The principle of the invention consists in making said intermediate structure from a special material referred to as "glass foam" or "cellular glass", in such a manner that this material completely fills the space between the two glass plates and thereby forms a uniform assembly, unlike conventional cellular structures.

A mirror substrate is thus provided whose mechanical and thermal uniformity are derived essentially from the fact that the material used for the plates of glass and for the intermediate structure have very similar properties, and the contact between the intermediate structure and each of the two plates of glass where they are glued to one another is very close and uniform.

Although a one-piece intermediate structure of glass foam could be used, it turns out to be preferable, for reasons of making manufacture easier to perform, to make use of a composite intermediate structure of glass foam, which composite structure is substantially uniform in nature.

That is to say that the composite structure of glass foam is not made as a single piece, but rather is built up from a plurality of glass foam elements, which elements are glued together in a manner described below.

In a preferred embodiment of the invention, the two preformed glass plates are symmetrical. As a result the two glass plates which are glued on opposite sides of the intermediate structure of glass foam react in like manner to external influences, thereby enabling phenomena of the kind exploited in bimetallic strips to be cancelled.

In the preferred embodiement of the invention, the intermediate structure comprises a central core of glass foam having two opposite parallel faces; a first set of blocks of glass foam each of which is glued firstly to the inside face of one of the glass plates, and secondly to one of the faces of the central core; and a second set of blocks of glass foam each of which is glued firstly to the inside face of the other glass plate, and secondly to the other face of the central core.

The thickness of the core increases with increasing diameter of the substrate. For large diameter substrates it is therefore possible for the core itself to be built up from a plurality of layers of blocks of glass foam which are glued together.

Preferably the blocks in each of the said two sets of blocks are disposed side by side and are glued only to the adjacent one of the plates of glass and to one of the faces of the central core.

Advantageously, the blocks are in the form of rectangular parallelepipeds having one prepared face suitable for being glued to the inside face of one of the plates of glass and an opposite prepared face suitable for being glued to a prepared face of the central core.

The prepared faces of the blocks, and similarly the prepared faces of the central core, are initially coated with a cement/glue type coating which once dry and suitably worked serves to eliminate surface irregularities from the glass foam and facilitates subsequent gluing.

The invention also provides a method of preparing a mirror substrate which, essentially, comprises gluing the respective inside faces of two preformed plates of glass on two opposite faces of a composite intermediate structure.

In the preferred implementation of the invention, in which the intermediate composite structure comprises a central core of glass foam and two sets of blocks of glass foam, the method comprises gluing each of the blocks in the two sets firstly to the inside face of one of the plates of glass and secondly on one of the faces of the central core. In an advantageous mode of performing the invention, the two sets of blocks of glass foam are initially glued to the respective inside faces of the two plates of glass, and after the glue has set the two sets of glass foam blocks as held together by their respective plates of glass are glued to respective faces of the central core.

The blocks of glass foam are advantageously obtained by sawing up a thick block of glass foam which has one of its faces already prepared with a cement/glue type coating.

Each of the glue faces of the blocks must be prepared after the thick plate has been cut up into blocks, in such a manner as to have the same radius of curvature as the plate of glass. The individual blocks cut out in this way are then placed side by side and glued on the respective inside faces of the two plates of glass, and pressure is exerted while the glue sets.

The opposite faces of the individual blocks are also prepared in such a manner as to ensure that each set of blocks on its glass plate has an accurately plane face. The opposite faces of the central core are prepared in a similar manner so as to enable the plane faces of the sets of glass blocks to be subsequently glued to the plane faces of the central core.

It is preferable to use different glues for gluing the blocks of glass foam to the plates of glass and for gluing the blocks of glass foam to the central core of glass foam.

The blocks are preferably glued to the inside faces of the two plates of glass by using a glue which is plastic in nature and thixotopic in character, for example an epoxy type of glue.

In contrast, the blocks of glass foam are preferably glued to the central core by means of a polymerizable glue which hardens after polymerizing, for example an epoxy type glue.

BRIEF DESCRIPTION OF THE DRAWINGS

Embodiments of the invention are described by way of example with reference to the accompanying drawing, in which.

MORE DETAILED DESCRIPTION

Figure 1:
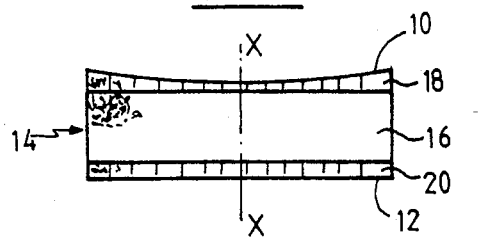
FIG. 1 is a section through the axis of symmetry of a first mirror substrate in accordance with the invention, said substrate having plates of glass which are not symmetrical.

FIG. 1 shows a mirror substrate for use in precision optics, and it comprises two preformed glass plates 10 and 12 which are glued by their respective inside faces to either side of an intermediate structure 14 which comprises a central core 16, a first set 18 of blocks of glass foam each of which is glued between the inside face of the plate of glass 10 and one of the two faces of the central core 16, and a second set 20 of blocks of glass foam each of which is glued between the inside face of the plate of glass 12 and the other face of the central core 16.

In the embodiment shown in FIG. 1, the plate of glass 10 is preformed so as to have a concave outside face suitable for subsequently constituting a concave mirror. To this end, the outside face of the plate 10 is subsequently worked in a suitable manner, including having a reflective coating applied thereto, e.g. of aluminum.

In this case the plate of glass 12 is a plane plate having no optical function, but serving a mechanical function for the assembly as a whole.

The FIG. 1 mirror substrate is circularly symmetrical about an axis X—X and the plates 10 and 12 are circular plates. Such a mirror substrte may be made with a large diameter, and in particular it may have a diameter of more than one meter.

Figure 2:
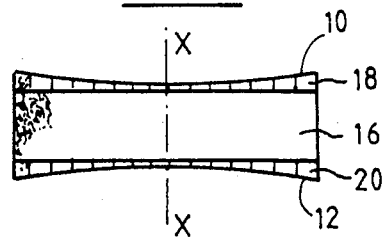
FIG. 2 is a section passing through the axis of symmetry of a second mirror substrate in accordance with the invention, said substrate being similar to that shown in FIG. 1 except that the plates of glass are symmetrical.

The mirror substrate shown in FIG. 2 is very similar to that shown in FIG. 1 except that the plate 12 is concave in a manner which is symmetrical to the glass plate 10, rather than being plane as for the FIG. 1 mirror substrate.

Thus, unlike the asymmetrical substrate shown in FIG. 1, the substrate shown in FIG. 2 is completely symmetrical. Such symmetry is advantageous since it automatically cancels out any bending effects of the kind which are exploited in bimetallic strips.

Figure 3:
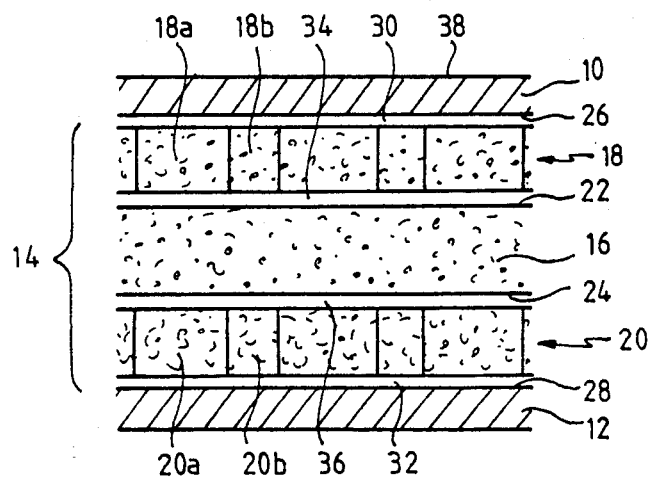
FIG. 3 is a section through a portion of the substrate shown in FIG. 2.
Figure 4:
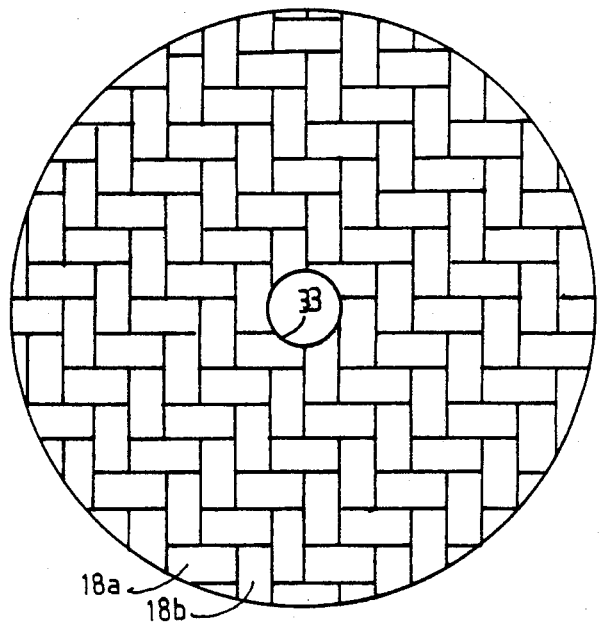
FIG. 4 is a plan view of the mirror substrate in FIGS. 2 and 3, showing more particularly the arrangement of one of the two sets of blocks of glass foam as seen through one of the two transparent plates of glass.

Reference is now made to FIGS. 3 and 4 to describe the structure of the above-mentioned mirror substrate in more detail.

The composite intermediate structure 14 comprises the glass foam central core 16, the set 18 made up of blocks of glass foam 18a, 18b, etc., and the set 20 made up of blocks of glass fom 20a, 20b, etc.

The central core 16 and the two sets of glass foam blocks 18 and 20 are made from commercially available plates of glass foam which are generally used for providing thermal insulation in buildings.

Such plates of glass foam are generally in the form of rectangular plates which are several tens of centimeters long and which are generally 50 mm thick. Such plates of glass foam are generally used for insulation purposes and are obtained by an industrial process referred to as "Foamglass".

This provides a particularly light material in that its density generally lies between 0.10 and 0.15, e.g. between 0.125 and 0.135. Such plates of glass foam may be obtained, for example, from the Corning France Corporation.

The central core 16 is cut out from such a plate of glass foam so as to have an outside diameter which is not less than the diameter of the plates 10 and 12, and to have two opposite outside faces 22 and 24.

The blocks of the set 18 are glued to the inside face 26 of the plate 10 and to the outside face 22 of the core 16. Similarly, the blocks in the set 20 are glued to the inside face 28 of the plate 12 and to the outside face 24 of the core 16.

The plates 10 and 12 may be made from ordinary glass since the plate 10 is intended for use as a reflector after a suitable reflective coating has been deposited thereon, and the plate 12 has no optical function at all. These plates may be obtained in the form of plane or concave plates as the case may be from an industrial supplier of glass, and the type of glass used may be chosen to satisfy requirements.

The blocks of the set 18 and the blocks of the set 20 are glued to the plates 10 and 12 respectively by using a glue which is plastic in nature, e.g. a glue of the flexible epoxy type such as the glue sold under the name "Epotechny 310 T". The corresponding layers of glue are resoect-ively designated by references 30 and 32 in FIG. 3.

The blocks in the set 18 and the blocks in the set 20 are glued on the respective faces 22 and 24 of the core 16 by means of a glue which is different in nature, mainly a polymerizable glue such as an epoxy type of glue. A particularly suitable type of glue is sold under the name "Epotechny 301.2".

In order to obtain a clearer understanding of the characteristics of a mirror substrate in accordance with the invention, the fabrication of said substrate is described with reference to FIGS. 3 and 4. In a preferred implementation of the method in accordance with the invention, the two sets of blocks 18 and 20 are initially glued to the inside faces 26 and 28 of the glass plates 10 and 12 respectively, and once that glue has set, the two sets 18 and 20, now held together by the plates 10 and 12, are glued to the outside faces 22 and 24 respectively of the central core.

The blocks in the two sets 18 and 20 are all prepared by sawing up a thick plate of glass foam in order to obtain blocks which are in the shape of generally rectangular parallelepipeds. Prior to cutting up the plates of glass foam into blocks, one of its faces is prepared using a cement/glue coating. Each gluing face of the blocks is prepared, after the blocks have been cut out, so as to have the same radius of curvature as the inside face 26 or 28 as the plate of glass 10 or 12 to which the sets of blocks are to be glued.

The gluing faces of the rectangular blocks are shaped on a tool having the same radius of curvature as the inside face 26 or 28, i.e. the radius of curvature of the gluing sphere.

This preparation also includes applying a cement/glue type coating which, once set, is smoothed in such a manner as to ensure that each of the block faces to be glued to a plate of glass has a radius of curvature which corresponds to the gluing sphere.

Each of the plates of glass prepared in this way is then sawn up into blocks 18a, 18b, etc. to constitute a set 18 or into blocks 20a, 20b, etc. to constitute the set 20.

Advantageously, these rectangular blocks are twice as long as they are wide. For example, the blocks may be 50 mm long, 25 mm wide and 20 mm thick.

The two sets of blocks prepared in this way are then glued on the respective inside faces of the glass plates 10 and 12, which inside faces are previously treated using an abrasive, for example emery, in order to facilitate gluing the blocks thereto. In order to do this, the above-defined plastic glue is initially spread over the inside faces 26 and 28 of the plates 10 and 12 in order to constitute layers 30 and 32.

The individual blocks of the set 18 and individual blocks of the set 20 are then placed side by side on the respective layers of glue 30 and 32. Pressure is applied to each of the blocks so as to ensure proper gluing and so as to expel any excess glue and any air bubbles that may remain, and thus obtain a final thickness of glue which is about one-tenth of a millimeter.

The blocks are advantageously positioned using a herringbone pattern as shown in FIG. 4 in which the blocks 18a, 18b, etc. are shown to be disposed along two main directions which are perpendicular to each other. This improves the statistical distribution of the forces and stresses applied to the glued face. A central hole 33 is provided through the blocks in order to pass light rays in a Cassegrain combination.

It may be observed that the blocks of each of the two sets of blocks are glued only to the corresponding one of the plates 10 and 12 and are not glued to each other. This improves the mechanical performance of the final assembly after gluing since each block is independent from its neighbors and is therefore less likely to be put under mechanical stress by its neighbors.

Once the blocks have been glued onto each of the two plates of glass, the opposite faces of the blocks are then glued to the faces 22 and 24 respectively of the core 16.

This gluing operation cannot be performed directly since it is initially necessary to prepare the faces for gluing.

The sets of block faces in the set of blocks 18 for gluing on the face 22 and in the set of blocks 20 for gluing on the face of 24 are prepared by machining and by being covered with a cement/glue type coating as defined above in order to provide an accurately plane surface for gluing. The opposite faces 22 and 24 of the core 16 are similarly prepared. Once the various surfaces to be glued have been suitably prepared, they can be glued together.

This stage of gluing is performed using a glue having the characteristics specified above and preferably of the epoxy type. The gluing is performed by depositing a layer of glue 34 on the face 22 and a layer of glue 36 on the face 24.

Gluing is then performed by exerting pressure so as to urge the two plates 10 and 12 towards each other.

Once the glue has set, the periphery of the mirror substrate is finished, i.e. its cylindrical edge is finished. This operation consists in machining the edge so that it is accurately cylindrical and then applying a coating of the cement/glue type.

Once the assembly has completely set, a mirror substrate is obtained which still requires further operations in order to be transformed into a mirror.

To this end, the outside face 38 of the glass plate 10 should be lapped and polished if necessary and should then have a reflecting coating applied thereto in conventional manner by depositing aluminum in a vacuum.

The mirror obtained in this way is ready for placing in a suitable optical instrument, for example in a telescope.

When making substrates of very large diameter, the core must be much thicker. In this case, it is advantageous to use a core which is itself built up from several layers of glass foam blocks, e.g. built up from 7.5×15 cm blocks disposed in the herringbone pattern shown in FIG. 4. The gluing should be performed by applying successive layers of blocks from the face 26 in order to have only two large gluing surfaces 24 on the assembly 20. In this case the handling operations during assembly make it impossible to provide an optical surface on the back glass plate 12 as well as on the front glass plate 10. However, a multi-layer substrate retains the desirable characteristics of uniformity.

Particularly advantageous results have been obtained using a central core and sets of glass foam blocks made from a glass foam having closed bubbles. However, there is no a priori reason why a glass foam using open bubbles should not be used instead.

However, even when using a glass foam having closed bubbles it is preferable to coat the outside of the blocks of glass foam, once they have been shaped with a varnish capable of withstanding a vacuum without degassing. The varnish is particularly useful for consolidating the highly friable periphery of the glass foam and for obtaining good performance in a vacuum.

The use of a glue which is plastic in nature and thixotropic in character for gluing the blocks of glass foam is particularly advantageous. This kind of glue makes it possible to provide a mirror substrate in which the glue substantially matches all the parameters of the materials used. In particular, it is capable of absorbing stresses and reducing deformation of the different materials due to their different behavior with changing temperature.

The resulting compact structure is thermally and mechanically uniform.

Since the intermediate structure is essentially constituted by glass foam, i.e. by a low density material whose density generally lies in the range 0.10 to 0.15, whereas the density of glass itself is higher and lies in the range 2 to 2.5, a lightened mirror substrate is obtained.

This weight saving is particularly advantageous since the mechanical means for supporting and also for displacing the mirror need not be as strong as had previously been necessary, and can therefore be considerably cheaper.

Also, it should be observed that glass foam is easy to obtain and cheap, and furthermore, it is easy to work.

Finally, it should be mentioned that the glues used in the invention retain their characteristics over long periods of time running to several years. In particular, they satisfy the severe criteria for use in space and they have the reputation of having a good length of life under vacuum conditions.

I claim:

1. A mirror substrate, in particular for precision optics, the substrate comprising two symmetrical plates of preformed glass which are glued by their respective inside faces on either side of an intermediate structure, wherein the outside face of one of the two plates is suitable for being treated to receive a reflecting coating, and wherein said intermediate structure is a substantially uniform composite structure built up from glass foam which comprises a central core made of glass foam and having two opposite parallel faces, a first set of blocks of glass foam each glued both to the inside face of one of said glass plates and to one of said faces of the central core, and a second set of blocks of glass foam each glued to the inside face of the other of said glass plates and to the other of said faces of the central core.

2. A mirror substrate according to claim 1, wherein the blocks of said first and second sets of blocks are disposed side by side and are glued only to one of the glass plates and to one of the faces of the central core.

3. A mirror substrate according to claim 2, wherein the blocks are in the shape of generally rectangular parallelepipeds having one face prepared to be suitable for gluing to the inside face of one of the plates of glass and having an opposite face prepared to be suitable for gluing to a prepared face of the central core.

4. A mirror substrate according to claim 3, wherein a cement/glue type coating is applied to said prepared faces of the blocks and to said prepared faces of the central core, and wherein said prepared faces are suitably worked, once the coating has set, in order to obtain an accurately plane surface.

5. A mirror substrate according to claim 1, wherein a glue which is plastic in nature, such as an epoxy type glue having thixotropic characteristics, is used to glue the blocks of glass foam to the inside faces of the two plates of glass.

6. A mirror substrate according to claim 5, wherein the inside faces of the two plates of glass are previously treated by means of an abrasive to improve adhesion of the glue.

7. A mirror substrate according to claim 1, wherein a polymerizable glue, such as an epoxy type glue, is used to glue the blocks of glass foam to the faces of the central core.

8. A mirror substrate according to claim 1, wherein the glass foam of the intermediate structure is a material having closed bubbles or cells, and having a density lying in the range 0.10 to 0.15.

9. A method of manufacturing a mirror substrate, in particular for precision optics, comprising the steps of:
   providing a central core made of glass foam and having two opposite parallel faces;
   gluing a first set of blocks of glass foam to one of said faces of the central core, and a second set of blocks of glass foam to the other of said faces of the central core; and
   gluing an inside surface of a first of two symmetrical plates of preformed glass to said first set of blocks of glass foam, and an inside surface of a second of said two symmetrical plates of preformed glass to said second set of blocks of glass foam.

10. A method according to claim 9, wherein the two sets of glass foam blocks are initially glued to the respective inside faces of the two plates of glass, and wherein the two sets of glass foam blocks are subsequently glued to the respective faces of the central core after the initial glue has set and fixed the blocks together.

11. A method according to claim 10, wherein each of the two sets of blocks are cut out from a thick plate of glass foam, one of whose faces is previously prepared in order to match the curvature of the inside face of the glass plate to which said set of blocks is to be glued.

12. A method according to claim 11, including placing the individual blocks cut out in this manner side by side and in contact with one another on the respective inside faces of the two plates of glass, wherein the opposite faces of each of the individual blocks are prepared so that each set of blocks presents an accurately plane gluing surface, the opposite faces of the central core are prepared in like manner, and the plane faces of the sets of blocks are glued to respective faces of the central core.

13. A method according to claim 11, wherein the faces of the blocks of glass foam and the faces of the central core are prepared by applying a cement/glue type of coating thereto, and by working said coating, after it has set, in order to obtain a plane surface.

14. A method according to claim 9, wherein the blocks of glass foam are glued to the inside faces of the two plates of glass by means of a glue which is plastic in nature, such as an epoxy type of glue which is thixotropic in character.

15. A method according to claim 14, wherein the inside faces of the two plates of glass are treated using an abrasive prior to gluing in order to improve adhesion of the glue thereto.

16. A method according to claim 9, wherein the blocks of glass foam are glued to the faces of the central core by means of a polymerizable glue, such as an epoxy type glue.

17. A method according to claim 12, wherein the faces of the blocks of glass foam and the faces of the central core are prepared by applying a cement/glue type of coating thereto, and by working said coating, after it has set, in order to obtain a plane surface.

* * * * *